(12) United States Patent
Young

(10) Patent No.: US 8,094,127 B2
(45) Date of Patent: Jan. 10, 2012

(54) DISPLAY DEVICE

(75) Inventor: Sarah Young, Fremont, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 1450 days.

(21) Appl. No.: 10/632,348

(22) Filed: Jul. 31, 2003

(65) Prior Publication Data
US 2005/0024342 A1 Feb. 3, 2005

(51) Int. Cl.
*G09G 5/00* (2006.01)
(52) U.S. Cl. ...... 345/173; 178/18.01
(58) Field of Classification Search .......... 345/156–179, 345/184; 178/18.01–18.03; 715/700–702
See application file for complete search history.

(56) References Cited

U.S. PATENT DOCUMENTS

| | | | |
|---|---|---|---|
| 5,252,951 A * | 10/1993 | Tannenbaum et al. | 345/173 |
| 5,903,099 A | 5/1999 | Johnson et al. | |
| 6,221,950 B1 | 4/2001 | Heinrich et al. | |
| 6,373,472 B1 * | 4/2002 | Palalau et al. | 345/173 |
| 6,429,846 B2 * | 8/2002 | Rosenberg et al. | 345/173 |
| 6,756,217 B1 | 6/2004 | Dave et al. | |
| 7,113,177 B2 | 9/2006 | Franzen | |
| 7,292,227 B2 * | 11/2007 | Fukumoto et al. | 345/173 |
| 2002/0002432 A1 | 1/2002 | Bockmann et al. | |
| 2002/0033795 A1 | 3/2002 | Shahoian et al. | |
| 2002/0084721 A1 * | 7/2002 | Walczak | |
| 2002/0106614 A1 | 8/2002 | Prince et al. | |
| 2003/0179190 A1 * | 9/2003 | Franzen | 345/173 |
| 2003/0234769 A1 * | 12/2003 | Cross et al. | 345/173 |
| 2004/0017362 A1 * | 1/2004 | Mulligan et al. | 345/173 |

FOREIGN PATENT DOCUMENTS

| | | |
|---|---|---|
| DE | 44 00 790 | 5/1995 |
| DE | 197 26 729 | 1/1999 |
| DE | 197 31 285 | 1/1999 |
| DE | 201 02 197 U | 7/2001 |
| DE | 201 80 024 U | 1/2002 |
| DE | 100 46 099 | 4/2002 |
| DE | 101 39 693 | 5/2002 |
| EP | 0 326 997 | 8/1989 |
| EP | 0 363 920 | 4/1990 |
| EP | 0 525 922 | 2/1993 |
| WO | WO 00/21795 | 4/2000 |
| WO | WO 01/54109 | 7/2001 |
| WO | WO 02/27645 * | 4/2002 |
| WO | WO 02/073587 | 9/2002 |

OTHER PUBLICATIONS

"Glass Menagerie," Perspectives: Research and Creative Activities at SIUC, Fall 1998, Retrieved from the Internet at <http://www.siu.edu./worda/persp/f98/Glass.html> on May 13, 2003.
"Actuation Response of Polyacrylate Dielectric Elastomers," Proc. SPIE, vol. 4329, pp. 141 to 147, Smart Structures and Materials 2001: Electroactive Polymer Actuators and Devices, Jul. 2001.
"Hyper-Redundant Robot Manipulators Actuated by Optimized Binary Dielectric Polymers," Andreas Winger et al., Department of Mechanical Engineering, Massachusetts Institute of Technology, Mar. 2002.

* cited by examiner

*Primary Examiner* — Regina Liang
(74) *Attorney, Agent, or Firm* — Kenyon & Kenyon LLP

(57) ABSTRACT

A display device includes a display, e.g., for displaying information relevant to the operation of a motor vehicle, on the display, an actuator layer being arranged, the operating surface geometry of which is deformable as a function of a control signal.

21 Claims, 5 Drawing Sheets

DISPLAY DEVICE

FIELD OF THE INVENTION

The present invention relates to a display device, e.g., designed as a touch screen, having a display, e.g., for displaying information relevant to the operation of a motor vehicle.

BACKGROUND INFORMATION

A touch screen is described, for example, in German Utility Model Patent Publication No. 201 02 197 U. German Utility Model Patent Publication No. 201 02 197 U describes a touch screen for visually representing electronic signals and for inputting symbols by touching the screen for confirmation purposes. It includes a functional plane for visual representation and keystroke input and a higher-level protective plane corresponding thereto that is deformable at certain points, as seen in resistive touch screens. In addition, the protective plane may not necessarily be deformable, but can be used for transmitting signals for the touch screen to determine the location of the user's input. Examples are capacitive, Surface Acoustic Wave (SAW), and Grounded Acoustic Wave (GAW) touch screens. In this context, when certain points of the functional plane are selected by touching-type contact across the protective plane, at least one confirmation signal is generated for the user's sense of touch (haptic stimulus) that is perceptible at the position of the point of contact in the deformed protective plane, and the confirmation signal for the sense of touch (haptic stimulus) is generated by vibration elements eccentrically positioned within and/or underneath the functional plane. In addition, in the touch screen described in German Utility Model Patent Publication No. 201 02 197 U, the generated vibrations are transmitted from the functional plane to the protective plane as the result of direct contacting of the two planes and/or via the edge regions of the planes by way of rigid or elastic connecting elements.

German Utility Model Patent Publication No. 201 80 024 U, i.e., PCT International Published Patent Application No. WO 01/54109, describes a touch-screen control featuring haptic feedback for inputting signals into a computer and for outputting forces to a user of the touch-screen control, the touch-screen control having a touch-screen input device which has a virtually plane touch-screen surface. On the basis of a position on the touch-screen surface that is touched by a user, a positional signal is input into a processor of the computer, the positional signal reproducing the position in two dimensions. The touch-screen control in accordance with the German Utility Model Patent Publication No. 201 80 024 U, i.e., PCT International Published Patent Application No. WO 01/54109, also has at least one actuator connected to the touch-screen input device, the actuator outputting a force to the touch-screen input device to provide the user touching the touch-screen surface with a haptic sensation, the actuator outputting the force directly to the touch-screen input device on the basis of force information output by the processor.

German Published Patent Application No. 197 31 285 describes an operating element for a device having a plurality of selectable menus, functions, and/or functional values. Its operating surface is understandable to the user and, by locally moving or touching the operating surface, the user is able to make his/her selection. The design of the operating surface can be altered to conform with the selected and/or selectable menu, function and/or functional value.

It is an object of the present invention to provide a display device, e.g., designed as a touch screen, having a display, e.g., for displaying information relevant to the operation of a motor vehicle.

SUMMARY

The above and other beneficial objects of the present invention may be achieved by providing a display device as described herein.

The afore-mentioned object may be achieved by providing a display device having a display, e.g., for displaying information relevant to the operation of a motor vehicle, on the display, e.g., on the side of the display facing a viewer, an actuator layer, which is transparent in an example embodiment of the present invention, being arranged there, the operating surface geometry of which may be deformable as a function of a control signal.

In an example embodiment of the present invention, the actuator layer may be able to be convexly and/or concavely deformed.

In an example embodiment of the present invention, the control signal may include an optical signal, e.g., light.

In an example embodiment of the present invention, the control signal may include an electrical and/or electromagnetic field.

In an example embodiment of the present invention, the actuator layer may be statically deformable at least for the duration of the control signal. This means, for example, that the actuator layer may not (tangibly) vibrate for the duration of the control signal, but rather may remain substantially statically deformed. This also applies particularly to when the control signal is a periodic signal.

In an example embodiment of the present invention, the display may include a touch screen. This means, for example, that user inputs are able to be entered using the display. In this context, in an example embodiment of the present invention, user inputs are able to be entered in the area of the actuator layer, thus, for example, through the actuator layer.

In an example embodiment of the present invention, the actuator layer may include a sol-gel. An example of a sol-gel is described, for example, in the article "Glas Menagerie" (Glass Menagerie), which is published under the Internet address www.siu.edu/worda/persp/f98/Glass.html.

In an example embodiment of the present invention, the actuator layer may be deformable in response to pressing using a force that exceeds a limiting value. In this manner, pressure-operated switches are able to be implemented, for example.

In an example embodiment of the present invention, the actuator layer may be controllable along the lines of a haptic feedback. For this, the display device may include a suitably designed computing device or logic circuit which is used to generate appropriate control signals.

In an example embodiment of the present invention, the display device may include a computing device which deforms the actuator layer via the control signal at a point of contact where the actuator has been touched by a user. In an example embodiment of the present invention, the computing device may deform the actuator layer at the point of contact only when a user has made an input via the display by touching the point of contact.

In an example embodiment of the present invention, the layer may be continuously actuated until touched by a user, thus created haptic feedback. The control system may release deformation on the actuator layer at the point of contact when a user has made an input via the display by touching the point of contact.

The display may be a monitor or, however, also an OLED.

Further aspects, features and details are set forth below in the following description of exemplary embodiments.

DETAILED DESCRIPTION

Figure 1:
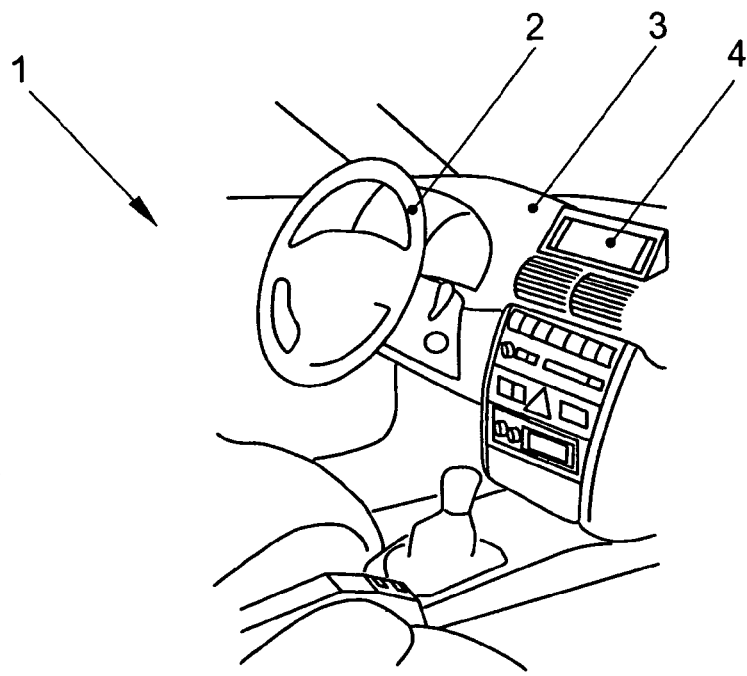
FIG. 1 is a schematic view of an exemplary embodiment of a cockpit or passenger compartment of a motor vehicle.
Figure 2:
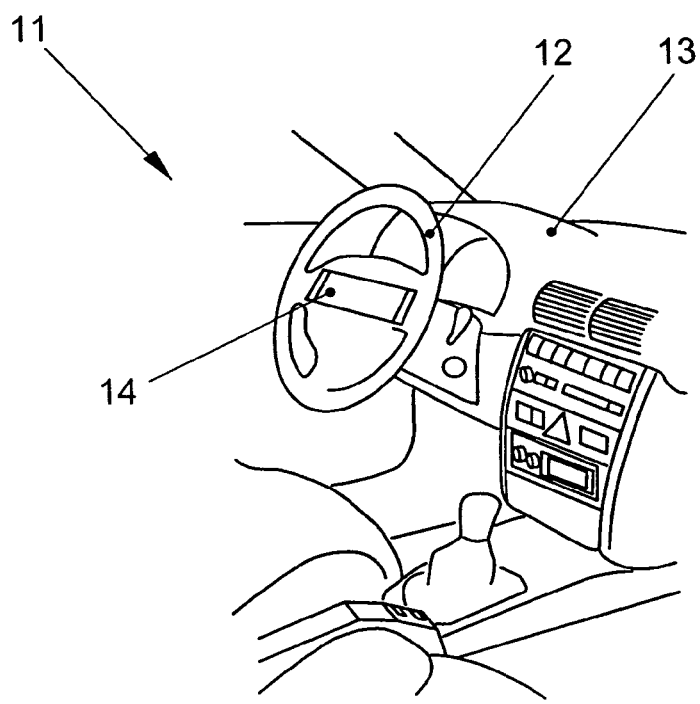
FIG. 2 is a schematic view of a further exemplary embodiment of a cockpit of a motor vehicle.

FIG. 1 schematically illustrates an exemplary embodiment of a cockpit 1 of a motor vehicle. In cockpit 1, a steering wheel 2 is positioned below an instrument panel or dashboard 3. Instrument panel 3 has a display device 4 positioned next to steering wheel 2. FIG. 2 illustrates an alternative exemplary embodiment of a cockpit 11 of a motor vehicle, in cockpit 11, a steering wheel 12 being positioned below an instrument panel 13. However, departing from the exemplary embodiment illustrated in FIG. 1, a display device 14 is positioned in steering wheel 12.

Figure 3:
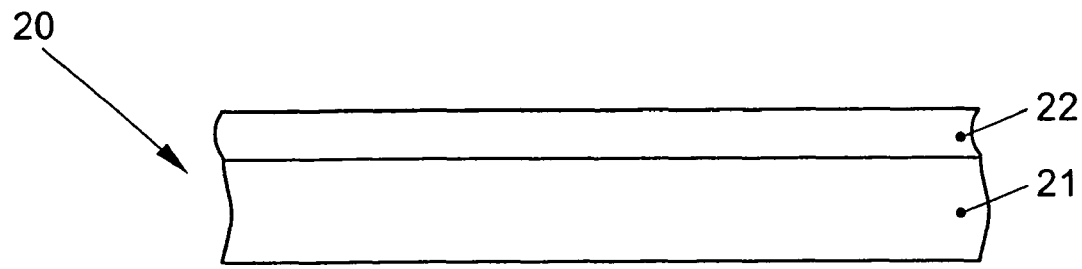
FIG. 3 is a cross-sectional view through an exemplary embodiment of a display having an actuator layer.
Figure 4:
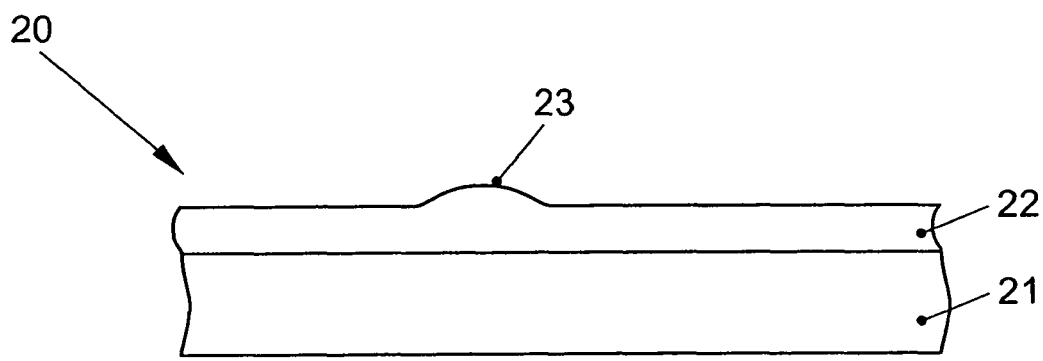
FIG. 4 is a cross-sectional view through the exemplary embodiment of a display in accordance with FIG. 3.

FIG. 3 is a schematic cross-sectional view through an exemplary embodiment of a display device 20. Display devices 4 and 14 may be designed in accordance with this exemplary embodiment. Display device 20 has a display 21 arranged as a touch screen on which an actuator layer 22 is positioned. As illustrated in FIG. 4, a control signal may be used to generate a convexly shaped region 23. An operating element may be simulated in this manner, for example.

Figure 5:
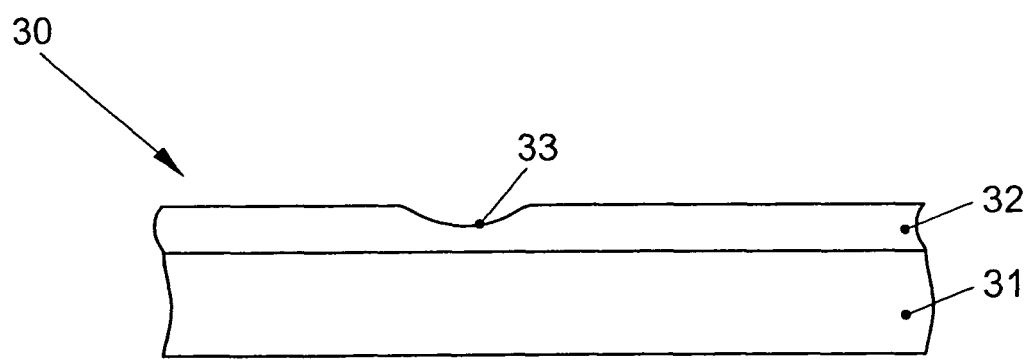
FIG. 5 is a cross-sectional view through an exemplary embodiment of a display having an actuator layer.

FIG. 5 is a schematic cross-section through another exemplary embodiment of a display device 30. Display devices 4 and 14 may be arranged in accordance with this exemplary embodiment. Display device 30 has a display 31 arranged as a touch screen on which an actuator layer 32 is provided. A concavely shaped region 33 may be generated by a control signal. In this manner, an operating element may be simulated, for example, in an alternative manner. It may also be provided for an operating element to be displayed only on display 31. By touching or pressing on actuator layer 32 at the location marked by reference numeral 33, a control signal may be generated which—in the sense of a haptic feedback—leads to the illustrated concave deformation.

More complex changes in the operating surface geometry may also be provided, which may be made up of combinations of a plurality of concave and/or convex deformations, for example.

Actuator layers 22 and 32 may have a sol-gel. An example of a sol-gel is described, for example, in the article "Glas Menagerie" (Glass Menagerie), published under the Internet address www.siu.edu/worda/persp/f98/Glass.html. Elastomers may also be used, however, as described, for example, in the article, "Actuation Response of Polyacrylate Dielectric Elastomers" by Kofod, Guggi, Risoe National Lab., Kornbluh, Roy D., Pelrine, Ron, SRI International, Sommer-Larsen, Peter, Risoe National Lab, Proc. SPIE vol. 4329, p. 141-147, Smart Structures and Materials 2001: Electroactive Polymer Actuators and Devices, Yoseph Bar-Cohen, Ed. The VHB band described in the article "Hyper-Redundant Robot Manipulators Actuated by Optimized Binary Dielectric Polymers" by Andreas Winger, Matthew Lichter, Steven Dubowsky, Moustapha Hafez, Department of Mechanical Engineering, Massachusetts Institute of Technology, published under the Internet address robots.mit.edu/publications/PDF/188.pdf, is easily controllable, but it is not transparent.

A material may be particularly suited for use as an actuator layer when its transparency or transmissivity is more than approximately 75%, when it renders possible a reversible controllable volume change by a factor of 2 to 5 (volume reduction and/or volume enlargement), particularly in a control process using an electrical field and/or light, when it is substantially unaffected by sunlight, is substantially usable in a temperature range of between −45° C. and 70° C., and when its hardness corresponds to the VHB band (compare "Hyper-Redundant Robot Manipulators Actuated by Optimized Binary Dielectric Polymers" by Andreas Winger, Matthew Lichter, Steven Dubowsky, Moustapha Hafez, Department of Mechanical Engineering, Massachusetts Institute of Technology).

The elements in FIGS. 3, 4 and 5 are shown in consideration of simplicity and clarity and are not necessarily sketched true-to-scale. Thus, for example, the orders of magnitude of some elements are exaggerated as compared to others in order to facilitate understanding of the exemplary embodiments of the present invention.

In an example embodiment, for example, display devices 4 and 14 arranged in accordance with display devices 20 and 30, respectively, may replace a display and operating device described in PCT International Published Patent Application No. WO 00/21795, while retaining their menu-driven functionality. FIGS. 6, 7, 8, 9, 10 and 11 illustrate various masks that are able to be displayed using a display device 40. Display device 40 may be arranged in accordance with display device 20 or 30 or a combination thereof.

Figure 6:
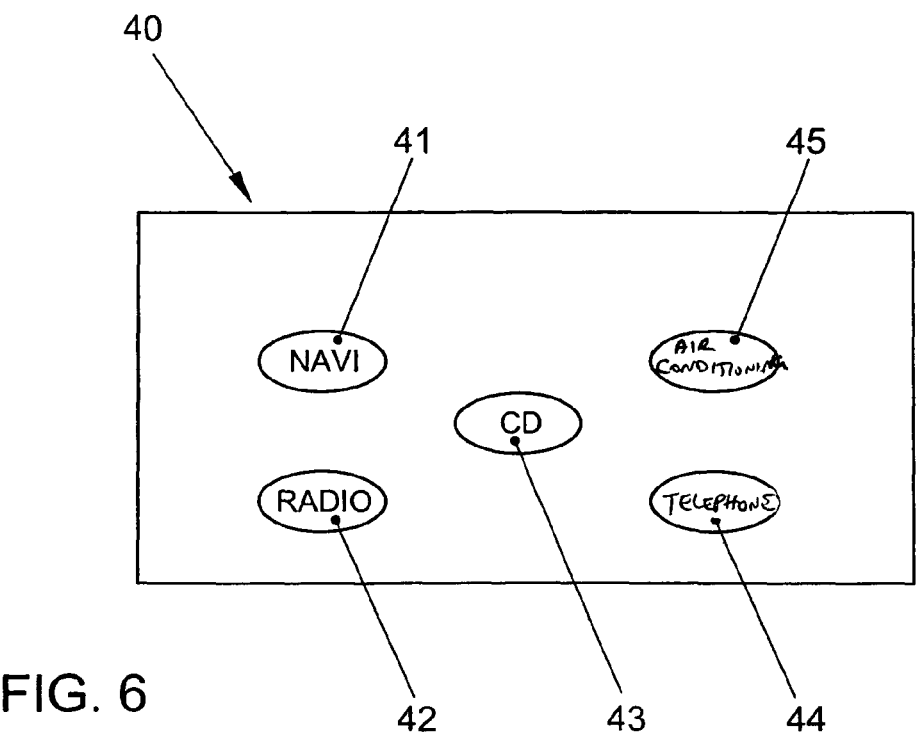
FIG. 6 is a schematic view of an exemplary embodiment of a mask base shown via a display device.

FIG. 6 illustrates display device 40 having a mask base. In this context, display device 40 displays five operating elements 41, 42, 43, 44 and 45, shaped as ellipses. By touching operating element 42 illustrated in FIG. 6, a mask is invoked for operating a radio, and, by touching operating element 43 illustrated in FIG. 6, a mask is invoked for operating a CD player.

Figure 7:
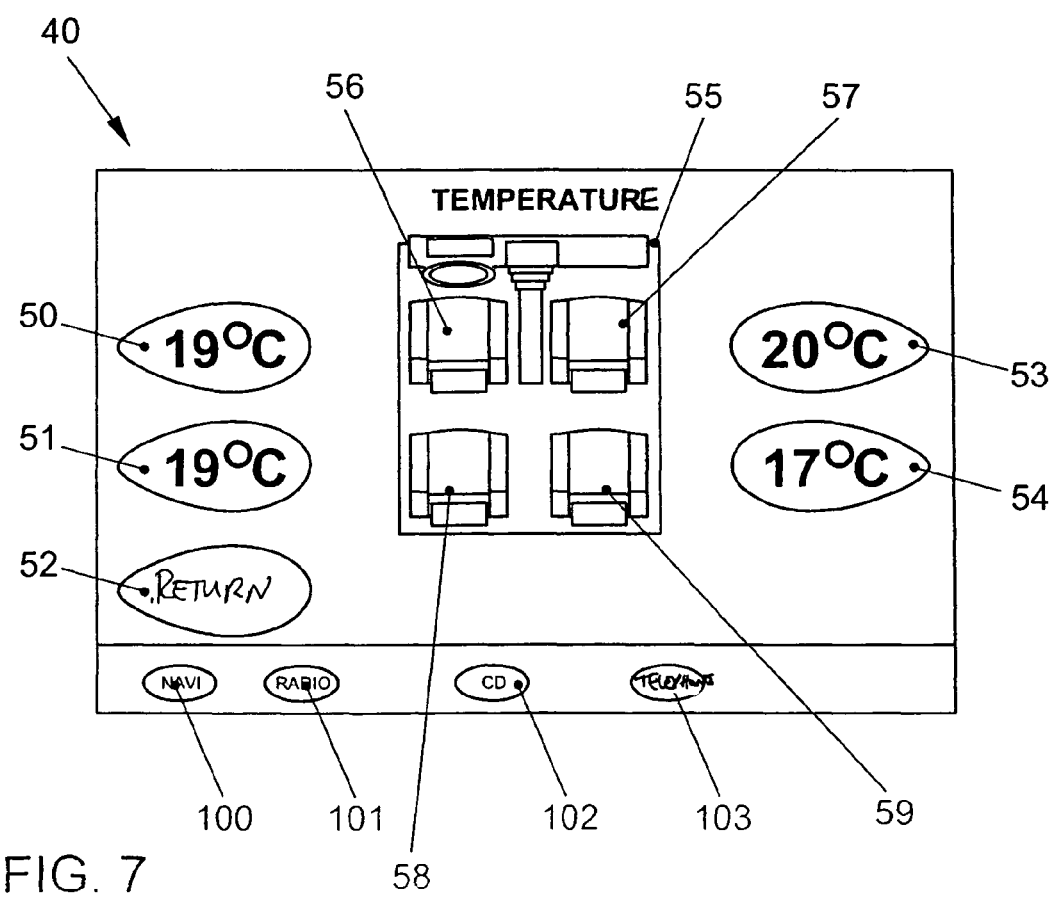
FIG. 7 is a schematic view of an exemplary embodiment of a mask for operating an air-conditioning system.

By touching operating element 45 illustrated in FIG. 6, a mask for operating an air-conditioning system is invoked in FIG. 7. In the mask illustrated in FIG. 7, temperature data pertaining to individual locations in the vehicle interior are indicated, together with operating elements 50, 51, 53 and 54, the temperature data pertaining to currently set temperatures that may be changed via operating elements 50, 51, 52, 53, and 54.

The illustration in FIG. 7 having the caption "TEMPERATURE" and the illustration of a passenger compartment 55 of a motor vehicle make it clear that the temperature setting in the vehicle interior is able to be adjusted individually and specifically for the particular seating position. Operating element 50 indicates that a temperature of 19° C. is set for the front driver's seat 56. Operating element 53 indicates that a temperature of 20° C. is set for the front driver's seat 57. For rear seats 58 and 59, 19° C. is set on the left side and 17° C. on the right side. Operating element 52 has an assignment, i.e., a functional assignment that is shown as "return" in the display field.

Figure 8:
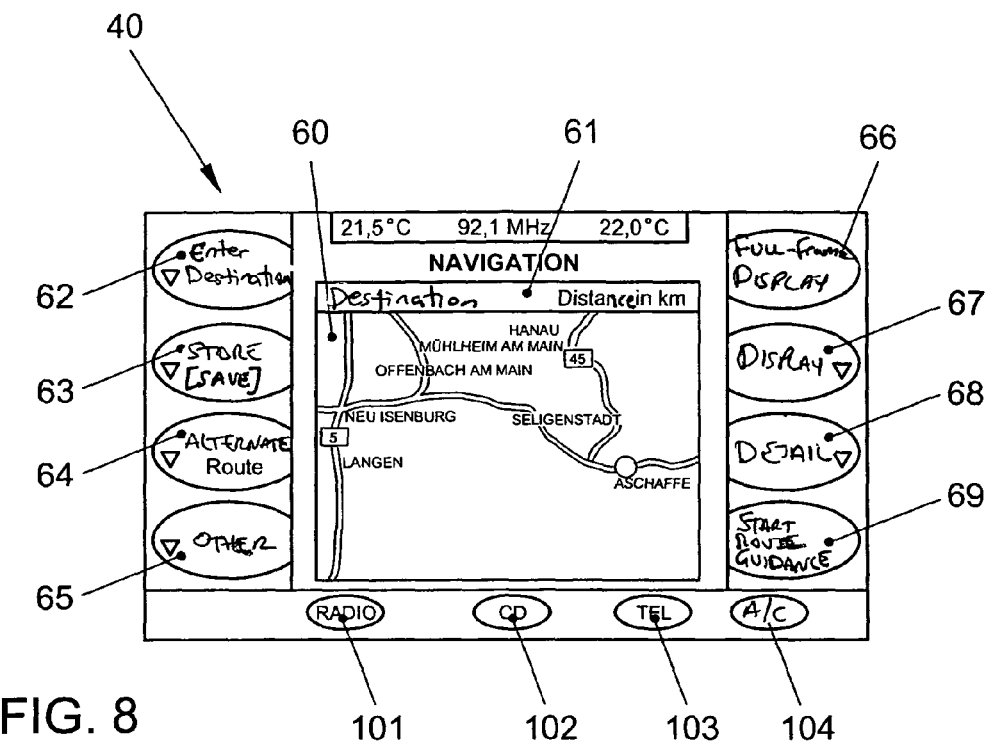
FIG. 8 is a schematic view of an exemplary embodiment of a mask for operating a navigational system.

By touching operating element 41 illustrated in FIG. 6, a mask illustrated in FIG. 8 for operating a navigational system is invoked. The mask indicates a detail of road map 60 depicting the momentary vehicle location, and, above road map 60 in a field 61, the destination and the distance to the destination. In addition, operating elements 62, 63, 64, 65, 67 and 68 are indicated, which may be touched to invoke submasks. Also indicated are an operating element 66 for displaying a full-frame display and an operating element 69 for starting a route guidance system. With regard to details pertaining to the underlaid menu, reference is made to PCT International Published Patent Application No. WO 00/21795, operating elements 62, 63, 64, 65, 66, 67, 68 and 69 replacing operating elements 3a, 3b, 3c, 3d, 3e, 3f, 3g and 3h described in PCT International Published Patent Application No. WO 00/21795.

Figure 9:
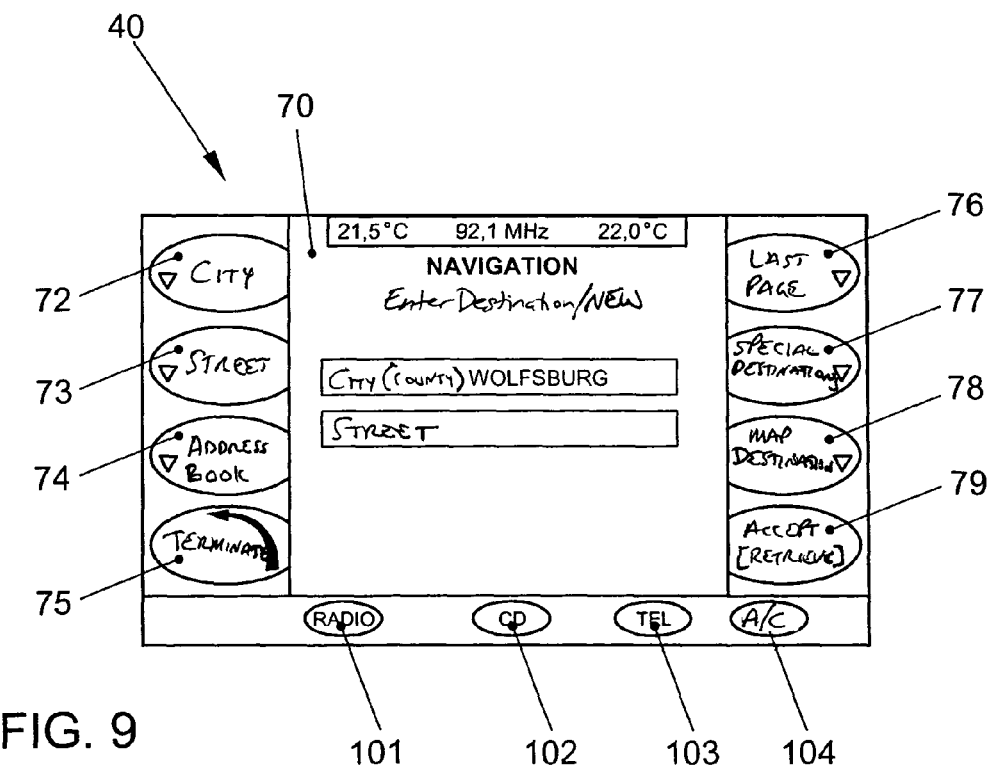
FIG. 9 is a schematic view of an exemplary embodiment of a submask for operating a navigational system.

By touching operating element 62 illustrated in FIG. 8, a submask is invoked in accordance with FIG. 9 that indicates the destination in a field 70. Operating elements 72, 73, 74, 75, 76, 77, 78 and 79 are additionally indicated by using the submask in accordance with FIG. 9. With regard to details pertaining to the underlaid menu, reference is made to PCT International Published Patent Application No. WO 00/21795, operating elements 72, 73, 74, 75, 76, 77, 78 and 79 shown on the display replacing operating elements 3a, 3b, 3c, 3d, 3e, 3f, 3g and 3h described in PCT International Published Patent Application No. WO 00/21795.

Figure 10:
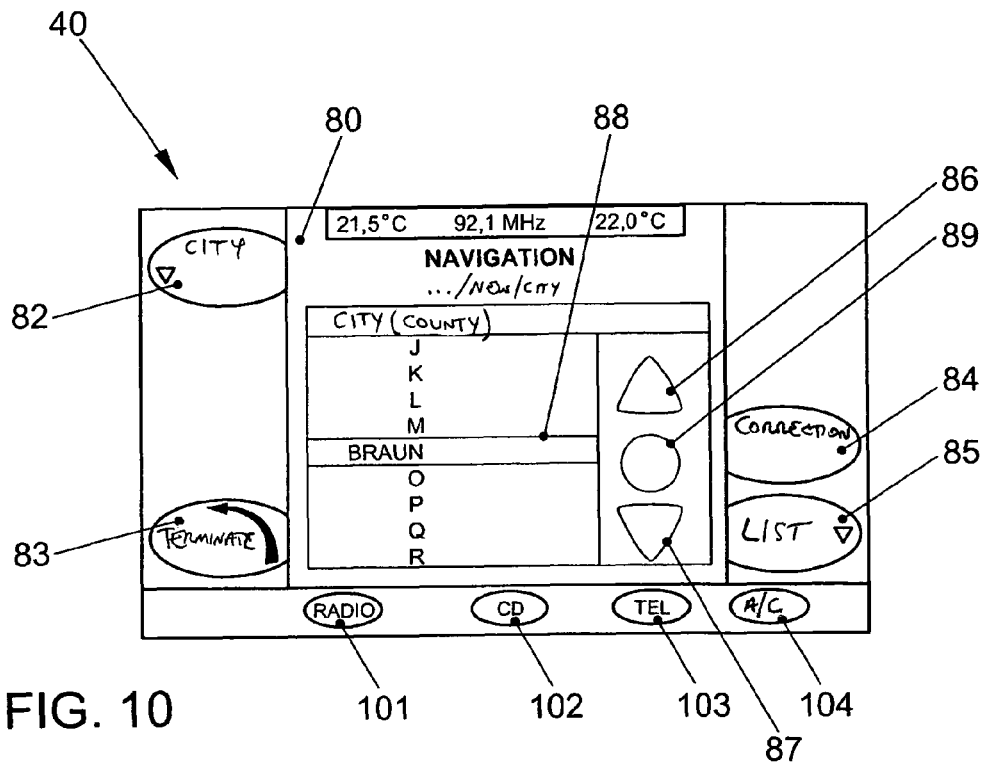
FIG. 10 is a schematic view of an exemplary embodiment of a further submask for operating a navigational system.

By touching operating element 72 illustrated in FIG. 9, a submask is invoked in accordance with FIG. 10 which, in a field 80, indicates a destination to be entered. In addition, using the submask in accordance with FIG. 10, operating elements 82, 83, 84 and 85 are indicated, which replace operating elements 3a, 3d, 3g and 3h described in PCT International Published Patent Application No. WO 00/21795. A letter selection row 88, as well as operating elements 86, 87 and 89 are indicated in field 80. Letter selection row 88 is movable up and down in response to touching operating elements 86 and 87, respectively. A marked letter may be selected by touching operating element 89.

Figure 11:
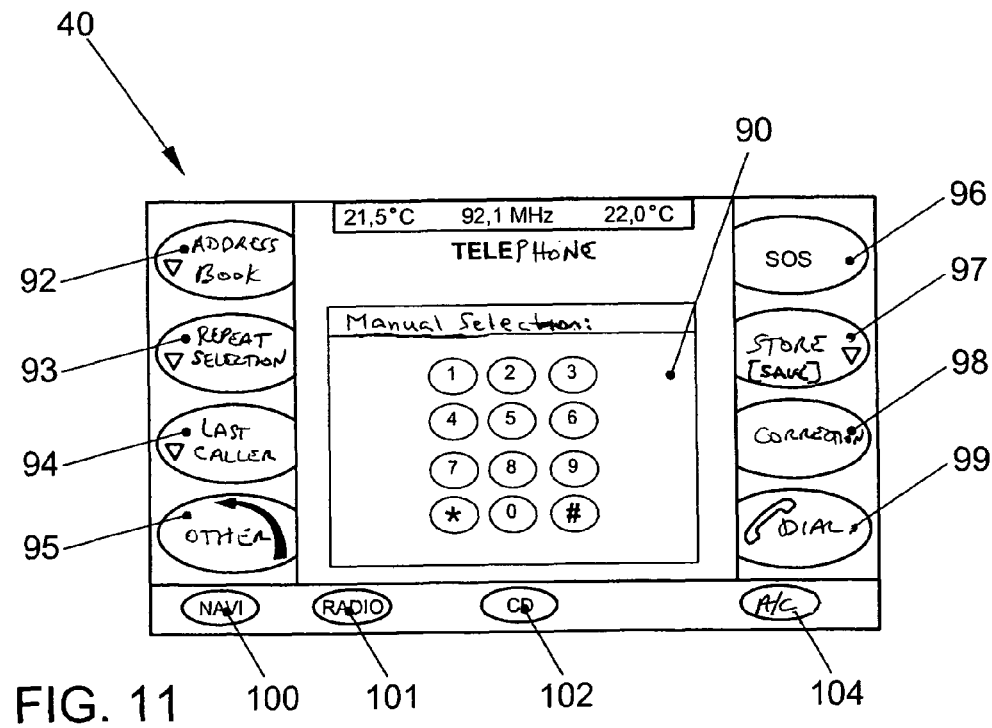
FIG. 11 is a schematic view of an exemplary embodiment of a mask for operating a telephone.

By touching operating element 44 illustrated in FIG. 6, a mask for operating a telephone is invoked in FIG. 11. In a field 90, it displays selector buttons for a telephone. In addition, using the submask in accordance with FIG. 11, operating elements 92, 93, 94, 95, 96, 97, 98 and 99 are indicated, which replace operating elements 3a, 3b, 3c, 3d, 3e, 3f, 3g and 3h described in PCT International Published Patent Application No. WO 00/21795. The selector buttons for a telephone that are indicated in field 90 are arranged as operating elements which may be used to dial a telephone number.

In addition, in the masks and submasks in accordance with FIGS. 6, 7, 8, 9, 10 and 11, respectively, operating elements 100, 101, 102, 103 and 104 are indicated which correspond to operating elements 41, 42, 43, 44 and 45.

Using operating elements 41, 42, 43, 44, 45, 50, 51, 52, 53, 54, 62, 63, 64, 65, 66, 67, 68, 69, 72, 73, 74, 75, 76, 77, 78, 79, 82, 83, 84, 85, 86, 87, 89, 92, 93, 94, 95, 96, 97, 98, 99, 100, 101, 102, 103 and 104, a haptic feedback is produced in an example embodiment. Thus, it may be provided, for example, that the actuator layer is deformable in the area of operating elements 41, 42, 43, 44, 45, 50, 51, 52, 53, 54, 62, 63, 64, 65, 66, 67, 68, 69, 72, 73, 74, 75, 76, 77, 78, 79, 82, 83, 84, 85, 86, 87, 89, 92, 93, 94, 95, 96, 97, 98, 99, 100, 101, 102, 103 and 104, e.g., by pressing using a force that exceeds a limiting value.

It may also be provided, however, that the actuator layer is deformed in response to a control signal in the area of an operating element 41, 42, 43, 44, 45, 50, 51, 52, 53, 54, 62, 63, 64, 65, 66, 67, 68, 69, 72, 73, 74, 75, 76, 77, 78, 79, 82, 83, 84, 85, 86, 87, 89, 92, 93, 94, 95, 96, 97, 98, 99, 100, 101, 102, 103 or 104, when the corresponding operating element 41, 42, 43, 44, 45, 50, 51, 52, 53, 54, 62, 63, 64, 65, 66, 67, 68, 69, 72, 73, 74, 75, 76, 77, 78, 79, 82, 83, 84, 85, 86, 87, 89, 92, 93, 94, 95, 96, 97, 98, 99, 100, 101, 102, 103 and 104 has been touched by a user.

In an example embodiment, this is accomplished only when a user input is made by touching the corresponding operating element 41, 42, 43, 44, 45, 50, 51, 52, 53, 54, 62, 63, 64, 65, 66, 67, 68, 69, 72, 73, 74, 75, 76, 77, 78, 79, 82, 83, 84, 85, 86, 87, 89, 92, 93, 94, 95, 96, 97, 98, 99, 101, 102, 103, 104 and 105, respectively, i.e., when the touching or contact operation has been carried out for a sufficient length of time. This may be provided for motor vehicle applications, since an operator, e.g., the vehicle driver, receives a confirmation of his/her input in this manner, without having to look at the display. In this manner, safety is enhanced during motor vehicle travel.

The device according to an example embodiment of the present invention is also transferable to a multifunctional operating device in accordance with German Published Patent Application No. 101 39 693, it being possible to replace the rotary element it describes with operating elements arranged in accordance with operating elements 86 and 87.

A motor vehicle in the present context is, for example, a land vehicle that is able to be used individually in road traffic. Motor vehicles in the present context are not limited to land vehicles having combustion engines.

REFERENCE NUMERAL LIST

| | |
|---|---|
| 1, 11 | cockpit or passenger compartment |
| 2, 12 | steering wheel |
| 3, 13 | instrument panel |
| 4, 14, 20, 30, 40 | display device |
| 21, 31 | display |
| 22, 32 | actuator layer |
| 23 | convexly shaped region |
| 33 | concavely shaped region |
| 41, 42, 43, 44, 45, 50, 51, 52, 53, 54 62, 63, 64, 65, 66, 67, 68, 69, 72, 73, 74, 75, 76, 77, 78, 79, 82, 83, 84, 85, 86, 87, 89, 92, 93, 94, 95, 96, 97, 98, 99, 100, 101, 102, 103, 104 | operating elements |
| 55 | passenger compartment |
| 56 | driver seat |
| 57 | front passenger seat |
| 58, 59 | rear seat |

| | |
|---|---|
| 60 | road map |
| 61, 70, 80, 90 | field |
| 88 | letter selection row |

What is claimed is:

1. A display device, comprising:
   a display; and
   an actuator layer arranged on an outwardly facing side of the display and including (a) a material having a reversibly and controllably changeable volume and (b) an operating surface geometry deformable as a function of a control signal generated by at least one of (a) a computation device and (b) a logic circuit, control signal being applied directly to the actuator layer;
   wherein the display is configured to display information relevant to operation of a motor vehicle.

2. The display device according to claim 1, wherein the actuator layer is transparent.

3. The display device according to claim 1, wherein the control signal includes an optical signal.

4. The display device according to claim 1, wherein the control signal includes light.

5. The display device according to claim 1, wherein the control signal includes an electrical field.

6. The display device according to claim 1, wherein the control signal includes an electromagnetic field.

7. The display device according to claim 1, wherein the actuator layer is statically deformable at least for a duration of the control signal.

8. The display device according to claim 1, wherein the display is configured to receive entry of user input.

9. The display device according to claim 8, wherein an area of the actuator layer is configured to receive the entry of the user input.

10. The display device according to claim 8, further comprising a computation device configured to deform the actuator layer in accordance with the control signal at a point of contact of the actuator layer touched by the user.

11. The display device according to claim 10, wherein the computation device is configured to deform the actuator layer at the point of contact only in response to an input via the display by the user by touch at the point of contact.

12. The display device according to claim 1, wherein the actuator layer includes a sol-gel.

13. The display device according to claim 1, wherein the actuator layer is controllable by haptic feedback.

14. The display device according to claim 1, wherein the actuator layer is deformable by pressure with a force that exceeds a limiting value.

15. The display device according to claim 1, wherein the actuator layer is configured to produce an operating element.

16. The display device according to claim 1, wherein the operating surface geometry is deformable in response to the control signal.

17. The display device according to claim 1, further comprising the computation device configured to generate the control signal, the operative surface geometry deformable in response to the control signal generated by the computation device.

18. The display device according to claim 1, wherein the operating surface geometry is deformable in response to an electronic control signal.

19. A steering wheel, comprising:
    a display device arranged on the steering wheel, the display device including a display and an actuator layer arranged on an outwardly facing side of the display, the actuator layer including (a) a material having a reversibly and controllably changeable volume and (b) an operating surface geometry deformable as a function of a control signal generated by at least one of (a) a computation device and (b) a logic circuit, control signal being applied directly to the actuator layer.

20. A passenger compartment of a motor vehicle, comprising:
    a display device arranged within the passenger compartment, the display device including a display and an actuator layer arranged on an outwardly facing side of the display, the actuator layer including (a) a material having a reversibly and controllably changeable volume and (b) an operating surface geometry deformable as a function of a control signal generated by at least one of (a) a computation device and (b) a logic circuit, control signal being applied directly to the actuator layer.

21. A motor vehicle, comprising:
    a display device arranged within the motor vehicle, the display device including a display and an actuator layer arranged on an outwardly facing side of the display, the actuator layer including (a) a material having a reversibly and controllably changeable volume and (b) an operating surface geometry deformable as a function of a control signal generated by at least one of (a) a computation device and (b) a control circuit, control signal being applied directly to the actuator layer.

* * * * *